Feb. 16, 1932.   H. T. HERR   1,845,601
INTERNAL COMBUSTION ENGINE (GASOLINE INJECTION)
Filed July 27, 1929
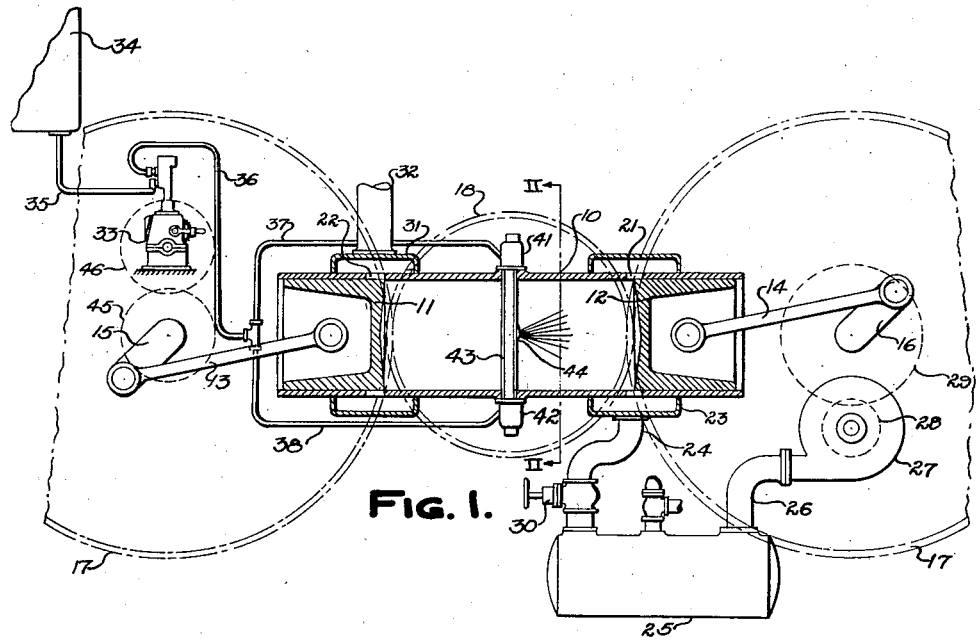
FIG. 1.
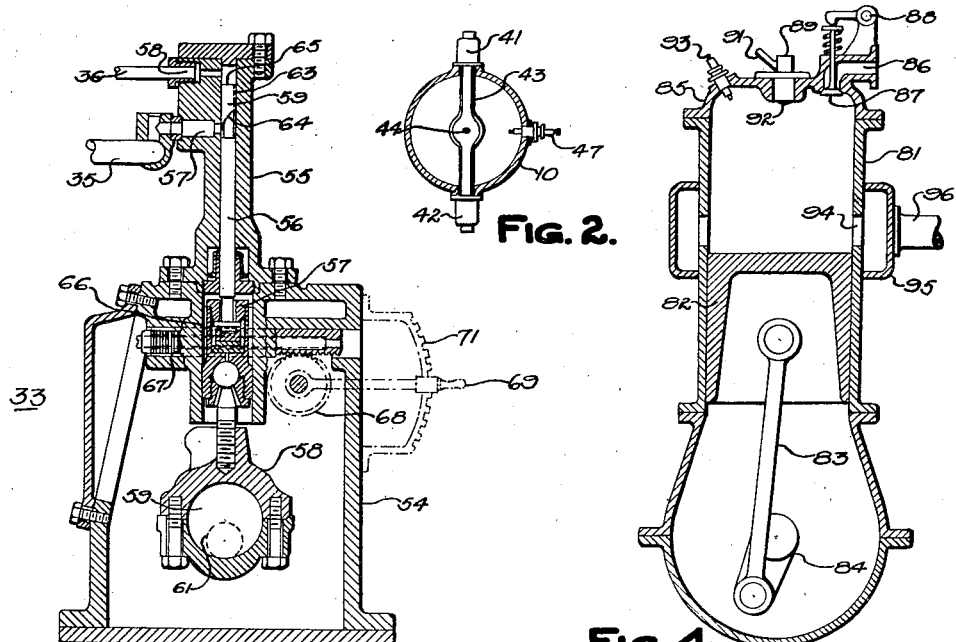
FIG. 2.
FIG. 3.
FIG. 4.
WITNESS
E. Lutz
INVENTOR
H. T. HERR.
BY
A. B. Ruavis
ATTORNEY Patented Feb. 16, 1932

1,845,601

UNITED STATES PATENT OFFICE

HERBERT T. HERR, OF PHILADELPHIA, PENNSYLVANIA, ASSIGNOR TO WESTINGHOUSE ELECTRIC & MANUFACTURING COMPANY, A CORPORATION OF PENNSYLVANIA

INTERNAL COMBUSTION ENGINE (GASOLINE INJECTION)

Application filed July 27, 1929. Serial No. 381,459.

My invention relates to internal combustion engines of the two-cycle type and it has for an object to provide apparatus of the character designated which shall be capable of operating reliably, effectively and efficiently.

It has for a further object to provide an engine adapted to utilize some of the more volatile fuels, such as gasoline or gasoline mixture, and which shall be capable of developing more power with a given piston displacement than engines of this character heretofore employed.

It has for a still further object to provide an engine of the foregoing character wherein the liquid fuel is directly injected into the engine cylinder and wherein volatilization of the fuel occurs within the engine cylinder.

It has for a further object to provide for an engine of the foregoing character an improved form of scavenging system which shall be effective to thoroughly cleanse the cylinder of the burned gases and at the same time avoid any loss of fuel through the cylinder exhaust port.

It has for still another object to provide an improved cycle of operation for an engine of the foregoing character, which cycle of operation shall be capable of effectively scavenging and supercharging the cylinder as well as effecting volatilization of the fuel within the cylinder.

It has for still another object to provide an improved cycle of operation for engines of the foregoing character wherein the scavenging fluid shall consist of air unmixed with fuel and wherein the fuel shall be separately and solidly injected into the engine cylinder.

It has for still another object to provide an improved cycle of operation wherein the opening and closing of the scavenging fluid inlet and exhaust ports, as well as the time of fuel injection, may be so coordinated as to effect thorough scavenging and supercharging of the engine cylinder and complete volatilization of the fuel within the engine cylinder.

It has for a still further object to provide an improved cycle of operation for an engine of the foregoing character wherein the period of injection of fuel into the engine cylinder is made as long as possible in order to insure, within the cylinder, a thorough commingling of the fuel and air and volatilization of the fuel.

It has for still another object to provide a novel arrangement for injecting and atomizing the fuel within the cylinder, which arrangement shall be especially applicable to engines of the opposed piston type, and which arrangement shall be capable of creating a high degree of turbulence within the engine cylinder during the compression and volatilization of the fuel-air mixture therein.

These and other objects are effected by my invention, as will be apparent from the following description and claims taken in connection with the accompanying drawings, forming a part of this application, in which:

Fig. 1 is a diagrammatic view, partly in section and partly in elevation, and illustrating an engine of the opposed piston type arranged in accordance with my invention;

Fig. 2 is a transverse sectional view, taken on the line II—II of Fig. 1;

Fig. 3 is a detail view, in section, of the fuel pump employed in Fig. 1; and,

Fig. 4 is a view, in sectional elevation, of a conventional form of two-cycle engine arranged in accordance with my invention.

It is well known that internal combustion engines of the two-cycle type are capable of producing almost twice the amount of power for a given piston displacement as engines of the four-cycle type. However, in the field of engines operating upon the Otto cycle, the two-cycle type has heretofore not been employed to the general extent of the four-cycle type for the principal reason that the two-cycle type is relatively inefficient. This lowered efficiency is caused largely by the fact that engines of this character and of the two-cycle type require scavenging which has heretofore been effected by a carburted mixture of fuel and air.

Theoretically, the carbureted mixture is intended to sweep out the cylinder of the burned gases and to discharge the same through the exhaust port, the exhaust port being timed to close at the instant when the exhaust gases have been entirely removed and when the carbureted mixture entirely fills the cylinder. However, in actual practice, it has been found that such accurate timing of the closing of the exhaust port is not possible and that some of the carbureted mixture is apt to escape through the exhaust port. This escape of unburned fuel consequently lessens the efficiency of the engine and at the same time produces a tendency toward objectionable back-firing in the engine exhaust.

I have, therefore, conceived of a form of engine of the two-cycle type wherein the cylinder is both thoroughly scavenged as well as supercharged with pure air, and not carbureted mixture, and wherein the liquid fuel, for example, gasoline or gasoline mixture, is pumped or solidly injected, through a suitable atomizer, into the compressed or supercharged air in the cylinder. Preferably, in order to obtain the supercharging effect referred to, opening and closing movements of the exhaust port are arranged in advance of the opening and closing movements of the air inlet port so that the air discharged by the blower sweeps through and out of the cylinder until such time as the exhaust port closes. Thereafter, air continues to enter the cylinder and supercharge the same until such time as the inlet port closes.

Injection of fuel takes place during the compression stroke and preferably commences slightly before the time of closing of the exhaust port and continues after the successive closings of both the exhaust and the inlet ports. However, the fuel is so directed into the engine cylinder that the exhaust port is sure to be closed before the fuel reaches the vicinity thereof and hence no fuel escapes into the exhaust pipe. In addition, the fuel is preferably injected into the cylinder in a direction counter to the incoming air so that no fuel escapes through the inlet port. By means of this counter flow of fuel and air, not only is a thorough commingling of the fuel and air effected, but a very high degree of turbulence is obtained.

Preferably, injection of fuel into the engine cylinder obtains for a substantial portion of the crank angle, for example, 120°, so that the period of time available within the cylinder for commingling of the fuel and air and proper volatilization of the fuel is very substantial. Injection of fuel may be continued from a time just prior to the closing of the exhaust port until just before the piston or pistons reach top or inner dead center whereupon the compressed charge is ignited by suitable means, such as, for example, an electric spark plug, after which the piston assumes its working stroke.

The engine may be operated reliably and efficiently. No carburetor is required as the fuel is pumped directly into the engine cylinder and volatilized within the cylinder. After each working stroke of the piston, the engine cylinder is thoroughly cleansed of the burned or exhaust gases, pure air being utilized as a scavenging fluid, and the timing of the fuel injection is so arranged that no portion of the subsequent charge of unburned fuel can escape through the cylinder ports. Back-firing in the engine exhaust is therefore completely eliminated.

Referring now to the drawings for a more detailed description of my invention, I show in Fig. 1, an engine embodying a cylinder 10 provided with opposed pistons 11 and 12. The pistons 11 and 12 are connected, through respective connecting rods 13 and 14, to crank shafts 15 and 16. Each crank shaft is provided with a driving gear 17, the driving gears 17 meshing with a common driven gear 18 to which the driven element, (not shown), may be connected. Located in one end portion of the cylinder is a plurality of circumferentially-spaced inlet ports 21, while located in the other end portion of the cylinder is a plurality of circumferentially-spaced exhaust ports 22. The arrangement is such that the piston 12 controls the opening and closing of the inlet ports 21 while the piston 11 controls the opening and closing of the exhaust ports 22.

Preferably, as indicated on the drawings, the exhaust port controlling piston 11 leads, angularly, the inlet port controlling piston 12, whereby during the outward stroke of the pistons, the exhaust ports 22 are opened before the inlet ports, permitting the scavenging fluid to sweep through the cylinder and to discharge the exhaust gases therefrom. Upon the return stroke, the piston 11 closes the exhaust ports 22 before the piston 12 closes the inlet ports 21, so that air is admitted to the cylinder after the exhaust ports are closed, and, in this way, the cylinder is supercharged with air.

The inlet ports 21 are provided with an intake manifold 23 to which air is supplied through a conduit 24 by a reservoir 25. Preferably, a valve 30 is provided in the conduit 24 for regulating the flow of air to the cylinder. The reservoir 25 may be supplied with air by any suitable form of blower apparatus which may, or may not, be driven by the engine. As shown, the reservoir 25 is supplied with air through a conduit 26 by a blower 27, the latter being operatively connected through gears 28 and 29 to the crank shaft 16. The exhaust ports 22 may be provided with an exhaust manifold 31 to which an exhaust pipe 32 is connected.

For supplying fuel to the engine cylinder, a pump 33 is preferably employed. As shown, the pump 33 may be supplied with fuel from any suitable source, such as a reservoir 34, through a conduit 35. The pump 33 periodically discharges the fuel at the pressure required for proper injection through a conduit 36 and branch conduits 37 and 38 to pressure-responsive check valves 41 and 42. The valves 41 and 42 are arranged to be opened in response to the periodic discharge pressure developed by the pump 33 and to admit the fuel to respective end portions of a fuel conduit 43 which extends transversely across the bore of the cylinder 10.

Provided at an intermediate portion of the fuel conduit 43 is an injection nozzle or orifice 44. Preferably, as shown, the nozzle 44 is arranged to discharge the fuel in a direction toward the scavenging piston and the inlet ports and away from the exhaust piston and exhaust ports. The nozzle 44 is provided with a suitable opening or openings for injecting the fuel into the cylinder in a highly atomized state, all as is well understood in the art. Preferably, the nozzle 44 is provided with a single opening of restricted flow-area as I prefer to make the period of fuel injection as long as possible and hence the rate of injection must be made relatively slow.

It will be apparent that by having the injection nozzle located centrally within the cylinder, as shown, the fuel spray may be so directed as to avoid any tendency for the fuel to remove the lubricant from the cylinder walls. In addition, the fuel conduit 43 is subjected to the heat obtaining in the engine cylinder and hence the temperature of the fuel passing to the injection nozzle is increased and volatilization of the same is more readily effected. It will be obvious that the fuel conduit 43 and spray nozzle 44 are so formed that the pistons may approach their inner dead center positions without any interference, the space intervening between the pistons when they are in their inner dead center positions being more than ample for accommodating the fuel conduit and spray nozzle.

The fuel pump 33 may be driven in any suitable manner in proper phase relation with the engine. As shown, it is operatively connected to the crank shaft 15 through gears 45 and 46, and, as the engine is of the two-cycle type, the pump 33 is driven at the same speed as the crank shaft 15 in order to effect a periodic discharge of fuel for each revolution of the crank shaft. As shown in Fig. 2, ignition of the combustible mixture within the cylinder may be effected by means of an electric spark plug 47, timed to act in predetermined phase relation with the engine in a manner well understood in the art.

Referring now to Fig. 3 for a form of fuel pump which I may employ, it will be noted that the pump 33 comprises a body portion 54 and a cylinder portion 55 mounted thereon. Disposed within the cylinder portion 55 is a plunger 56 which is operatively connected through a cross head 57 to an eccentric strap 58. The latter cooperates with an eccentric 59 provided on a pump drive shaft 61 for effecting a reciprocatory movement of the pump plunger 56, the pump drive shaft 61 being connected to the drive gear 46 in order that the pump may be driven from the crank shaft 15.

The pump cylinder 55 is provided with longitudinally-spaced inlet and discharge ports 57 and 58, the inlet port 57 communicating with the conduit 35 and the discharge port 58 with the conduit 36. Preferably, the pump plunger 56 is provided with a slide valve 59 arranged to cooperate with the fuel inlet port 57 so as to control the starting and stopping of each fuel injection period.

During the downward or non-working stroke of the plunger 56, fuel is supplied from the reservoir 34 and conduit 35 to the inlet port 57, filling the interior of the pump cylinder 55. Upon the upward or working stroke of the plunger, the fuel in the cylinder is displaced through the inlet port 57 until such time as the valve 59 covers the inlet port 57, whereupon the fuel in the upper end of the cylinder is trapped and is discharged, at a relative high velocity and pressure, through the outlet 58. Discharge of fuel through the outlet 58 continues until such time as the valve 59 again uncovers the inlet port 57, whereupon the fuel in the upper end of the cylinder is once more permitted to escape through the inlet port 57, a suitable, longitudinally-extending passageway 63 being provided in the valve 59 for permitting communication between its upper and lower cut-off edges.

Preferably, the lower cut-off edge 64 of the valve is inclined with respect to the leading cut-off edge 65 so that angular adjustments of the plunger 56 are effective to cause a longer or shorter portion of the valve face 59 to cooperate with the inlet 57. Accordingly, longer or shorter periods of fuel injection may be obtained by angular adjustment of the pump plunger. In order to effect such angular adjustments, the cross head 57 of the pump plunger is provided with longitudinally-extending teeth 66, which teeth mesh with a fuel rack 67. The latter in turn meshes with a pinion 68 to which is operatively secured to control lever 69 and a quadrant 71, whereby angular adjustments of the control lever 69 effect corresponding angular adjustments of the pump plunger 56 and consequently lengthen or shorten the period of fuel injection. For a more detail description of the foregoing fuel pump, reference may be had to my copending application, Serial No. 292,197, entitled "Fuel injection system" and assigned to the Westinghouse Electric & Manufacturing Company.

From the foregoing description, the operation of my improved form of engine will be apparent. The reservoir 34 is filled with a suitable fuel. While various hydro-carbon fuels may be employed, I prefer to use a fuel of the more volatile type, such as, for example, gasoline. In the present example, the gasoline is mixed with about 10% of lubricating oil in order to insure thorough lubrication of the fuel pump 33 as well as the pistons of the engine cylinder.

Assuming the engine to be in operation, the pistons 11 and 12 move outwardly upon their working stroke, at the end portion of which the piston 11 opens the exhaust ports 22 and the gases are liberated through the exhaust pipe 32. Thereafter, the piston 12 opens the inlet ports 21 and scavenge air under pressure enters the cylinder. The scavenge air entering the cylinder, sweeps the burnt gases remaining in the cylinder outwardly through the exhaust ports, the scavenging process continuing until such time as the pistons effect their return or non-working strokes that is, move toward each other, whereupon the piston 11 effects closure of the exhaust ports.

The piston 11 first closes the exhaust ports 22, but, as stated heretofore, the exhaust port controlling piston 11 leads the inlet port controlling piston 12 and hence the inlet ports 21 remain open for some time after the exhaust ports 22 are closed. During this time, air under pressure enters the cylinder 10 and effectively supercharges the same. Preferably, the piston 11 is arranged to close the exhaust ports 22 when its crank angle is located about 135° before inner dead center and the fuel pump 33 is so timed that it commences to discharge fuel through the injection nozzle 44 at approximately this point in the engine cycle. Preferably, the injection of fuel into the cylinder commences before the exhaust ports are entirely closed or slightly before the exhaust port controlling piston 11 has reached a position 135° before inner dead center.

Referring now to the pump shown in Fig. 3, it will be apparent that the pump 33 commences to discharge fuel as soon as the leading cut-off edge 65 of the valve 59 laps the inlet port 57 and that the discharge period continues until such time as the trailing cut-off edge 64 of the valve 59 uncovers the inlet port 57. Preferably, the pump 33 is so arranged that injection of fuel into the engine cylinder through the nozzle 44 continues until such time as the piston 11 reaches a position about 15° from its inner dead center position, whereupon the injection period is terminated. It will therefore be apparent that injection of fuel into the engine cylinder continues for a relatively long period of time, that is, for about 120° displacement of the crank angle, so that a relatively long period of time is made available for thorough commingling of the fuel and air within the cylinder and for volatilization of the fuel.

During the early portion of the fuel injection period, the inlet ports 21 are open and it will be apparent that the air enters and flows into the cylinder in a direction counter to the direction of the fuel spray. Such an arrangement insures a thorough commingling of the fuel and air and at the same time provides a very turbulent condition within the cylinder. As stated heretofore, the fuel injection period preferably starts before the piston 11 has entirely closed the exhaust ports 22, but, the timing is such that, before the fuel can reverse its direction of flow and reach the vicinity of the exhaust ports, the latter have been closed. Hence, there is no possibility of any unburnt fuel escaping through the exhaust port.

During the injection of the fuel into the cylinder, the pistons 11 and 12 approach each other upon their compression or non-working stroke and after the period of fuel injection has been terminated and the charge of fuel and air compressed to the proper pressure, the spark plug 47 is timed to ignite the charge in a manner well understood in the art. Thereafter, the pistons move outward upon their working strokes and the cycle of operation is completed.

Preferably, the fuel-air mixture is compressed to a pressure having a corresponding temperature less than its self-ignition temperature, the engine operating on the Otto cycle. Good results may be obtained with compression ratios varying between 4½ to 1 and 5 to 1, although it is to be understood that these figures are given merely by way of example. Although an engine of the foregoing character may be also operated on the Diesel cycle by properly increasing the compression ratio, nevertheless, I prefer to utilize spark ignition rather than compression ignition as I have found that better control of the engine operation is afforded.

From the foregoing, it will be apparent that I have developed a form of engine of the two-cycle type wherein a pump is utilized for periodically injecting the fuel into the engine cylinder and wherein the fuel is volatilized within the engine cylinder. It is further apparent that, with my type of engine, pure air, and not a mixture of fuel and air, is used for scavenging purposes. In addition, the cylinder is effectively supercharged with air from the same source. It will also be apparent that I have devised a cycle of operation wherein the duration of the period of fuel injection continues for as long a time as possible and hence better volatilization of the fuel is obtained and a more thorough commingling of the air and fuel assured.

While I have described my invention as being especially applicable to engines of the opposed piston type, nevertheless it is submitted that my invention is also applicable to engines of the more conventional types and referring now, for example, to Fig. 4, I show an engine provided with a cylinder 81 having disposed therein a piston 82 operatively connected, by a suitable connecting rod 83, to a crank shaft 84, all arranged in a manner well understood in the art. The cylinder 81 is provided with a removable head portion 85 having disposed therein an air inlet 86. The passage of air through the inlet 86 is controlled by a suitable valve 87 opened and closed periodically in timed relation with the crank shaft 84 by means of a cam shaft 88, all in a manner well understood in the art. Also located in the cylinder head 85 is a fuel injection nozzle 89 to which fuel may be supplied from a pump, such as shown in Fig. 3, through a conduit 91. The fuel injection nozzle 89 is provided with a tip portion 92 for spraying and atomizing the fuel into the engine cylinder. Also disposed within the cylinder is an electric spark plug 93 for igniting the combustible charge.

Like the engine shown in Fig. 1, the engine shown in Fig. 4 is intended for two-cycle operation and hence is provided, at an intermediate portion of its cylinder 81, with a plurality of circumferentially-spaced exhaust ports 94, arranged to be covered and uncovered by the piston 82. The exhaust ports 94 are provided with an exhaust manifold 95 to which an exhaust pipe 96 is connected.

Assuming an engine such as shown in Fig. 4 to be operating, the piston 82 moves downwardly upon its working stroke. Upon sufficient downward movement, the exhaust ports 94 are opened and the exhaust gases are liberated through the exhaust pipe 96. After the ports 94 have been opened for a period of time, the valve 87 is opened by the cam shaft 88 to admit scavenging air into the cylinder 81. This scavenging air sweeps through the cylinder and discharges the burnt gases remaining in the cylinder through the exhaust ports 94.

Upon the return stroke of the piston 92, the exhaust ports 94 are first closed after which the valve 87 remains open to permit additional air to enter the cylinder and to thoroughly supercharge the same, after which the valve 87 is closed. The timing of the fuel pump is such that, at approximately the time when the piston 82 closes the exhaust ports 94, injection of fuel commences. During the early portion of the fuel injection period, air is also entering the cylinder for supercharging purposes and hence there is a thorough commingling of fuel and air and a very turbulent condition is obtained within the cylinder. After the air inlet valve 87 closes, injection of fuel continues until the piston 82 approaches within a few degrees of its upper dead center, whereupon the injection of fuel is terminated. The fuel and air charge being sufficiently compressed, the spark plug 93 acts to ignite the charge in a manner well understood in the art. Thereafter, the piston 82 travels downward upon its working stroke and the cycle of operation is completed.

It will therefore be apparent that it is possible, in two-cycle engines of the type shown in Fig. 4, to obtain the advantages of my improved cycle of operation inasmuch as the fuel may be solidly injected or pumped into the cylinder for a substantial period of time, the cylinder scavenged with air instead of carbureted mixture, the cylinder properly supercharged with air and volatilization of the fuel effected within the confines of the cylinder. Such a form of engine is capable of developing an extraordinary amount of power consistent with its piston displacement.

While I have shown my invention in two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In an internal combustion engine, the combination of a cylinder, longitudinally spaced air inlet and exhaust outlet ports provided in the cylinder, opposed pistons in the cylinder and arranged to control, respectively, the inlet and exhaust ports, and means for supplying fuel to the engine cylinder, said fuel supplying means being arranged to direct the fuel in a direction toward the air inlet port controlling piston and away from the exhaust port controlling piston.

2. In an internal combustion engine, the combination of a cylinder, longitudinally spaced air inlet and exhaust outlet ports provided in the cylinder, opposed pistons in the cylinder and arranged to control, respectively, the inlet and exhaust ports, and means for spraying fuel into the engine cylinder, said fuel spraying means being arranged to direct the fuel in a direction toward the air inlet port and away from the exhaust outlet port.

3. In an internal combustion engine, the combination of a cylinder, longitudinally spaced air inlet and exhaust outlet ports provided in the cylinder, opposed pistons in the cylinder and arranged to control, respectively, the inlet and exhaust ports, means for periodically translating air longitudinally through the cylinder in a direction from the air inlet port toward the exhaust outlet port for successively scavenging and supercharging said cylinder, and means for periodically injecting fuel into the cylinder in a direction counter to the direction of flow of air therethrough.

4. In an internal combustion engine, the combination of a cylinder, opposed pistons in the cylinder, a fuel conduit extending transversely across the bore of the cylinder intermediate of the pistons, said fuel conduit having a fuel inlet provided in each of its terminal portions, means for periodically discharging fuel to each of said fuel inlets, and a spray nozzle disposed interiorly of the cylinder and communicating with the conduit, said spray nozzle being arranged to receive fuel from both inlets of the conduit and to discharge the same into the engine cylinder.

5. In an internal combustion engine, the combination of a cylinder, opposed pistons in the cylinder, a fuel conduit extending transversely across the bore of the cylinder and intermediate of the pistons, said fuel conduit having a fuel inlet provided in each of its terminal portions, valve mechanisms responsive to fuel pressure associated with each terminal portion of the fuel conduit for admitting fuel thereto, a spray nozzle disposed interiorly of the cylinder and communicating with the fuel conduit, and means for periodically discharging fuel under pressure to the valve mechanisms for injection into the engine cylinder.

In testimony whereof, I have hereunto subscribed my name this 27th day of June, 1929.

HERBERT T. HERR.